(12) United States Patent
Briggs et al.

(10) Patent No.: US 9,792,263 B2
(45) Date of Patent: Oct. 17, 2017

(54) HUMAN INPUT TO RELATE SEPARATE SCANNED OBJECTS

(71) Applicant: Konica Minolta Laboratory U.S.A., Inc., San Mateo, CA (US)

(72) Inventors: William John Briggs, Broomfield, CO (US); Mabry Frazier Dozier, III, Lafayette, CO (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 30 days.

(21) Appl. No.: 14/671,234

(22) Filed: Mar. 27, 2015

(65) Prior Publication Data

US 2016/0283444 A1    Sep. 29, 2016

(51) Int. Cl.
| | |
|---|---|
| G06F 17/00 | (2006.01) |
| G06F 17/21 | (2006.01) |
| G06F 17/24 | (2006.01) |
| H04N 1/04 | (2006.01) |
| G06F 17/22 | (2006.01) |
| G06F 17/30 | (2006.01) |
| G06K 9/00 | (2006.01) |

(52) U.S. Cl.
CPC ........ *G06F 17/212* (2013.01); *G06F 17/2241* (2013.01); *G06F 17/24* (2013.01); *H04N 1/04* (2013.01); *G06F 17/211* (2013.01); *G06F 17/2247* (2013.01); *G06F 17/243* (2013.01); *G06F 17/3089* (2013.01); *G06F 17/30864* (2013.01); *G06F 17/30905* (2013.01); *G06K 9/00463* (2013.01); *G06K 2209/01* (2013.01); *H04N 2201/0082* (2013.01)

(58) Field of Classification Search
CPC ........... G06F 17/30011; G06F 17/3205; G06F 17/3089; G06F 17/2247; G06F 17/24; G06F 17/211; G06F 17/243; G06F 17/30864; G06F 17/30905; G06F 17/212; G06K 9/00463
USPC ................ 715/203–204, 208, 249, 253, 273; 382/176; 358/474, 448, 467
See application file for complete search history.

(56) References Cited

U.S. PATENT DOCUMENTS

| | | | | |
|---|---|---|---|---|
| 6,757,081 | B1* | 6/2004 | Fan ..................... | H04N 1/00002 358/2.1 |
| 2012/0008864 | A1* | 1/2012 | Kanatsu ............. | G06K 9/00449 382/176 |

* cited by examiner

*Primary Examiner* — Quoc A Tran
(74) *Attorney, Agent, or Firm* — Osha Liang LLP (57) ABSTRACT

A method for managing a hardcopy document (HD). The method includes: obtaining an image of the HD; identifying, within the image, a plurality of linking labels and a plurality of regions corresponding to the plurality of linking labels; extracting a plurality of strings from the plurality of regions; generating a combined string by combining the plurality of strings based on the plurality of linking labels; and generating an editable electronic version of the HD specifying the combined string.

14 Claims, 6 Drawing Sheets

HUMAN INPUT TO RELATE SEPARATE SCANNED OBJECTS

BACKGROUND

Many documents are stored and archived in a hardcopy format (e.g., paper, microfiche, microfilm, etc.). Although it is easy to create an image of a hardcopy document by scanning the hardcopy document (HD), the text in the image does not allow for easily editing.

Many different character recognition (CR) algorithms (e.g., optical CR algorithms) exist that can generate an editable electronic version of the HD from the image of the HD. However, it is challenging for these algorithms to correctly identify different layout objects (e.g., main body, header, footer, linked textboxes, etc.) within the image of the HD. Accordingly, the markup of these editable electronic versions tend to include incorrect layout objects, that are then incorrectly interpreted by a word processing application. This reduces the editing functionality of the word processing application. Regardless, users are still interested in generating electronic versions of HDs for editing, modifying, and/or archiving.

SUMMARY

In general, in one aspect, the invention relates to a method for managing a hardcopy document (HD). The method comprises: obtaining an image of the HD; identifying, within the image, a first plurality of linking labels and a first plurality of regions corresponding to the first plurality of linking labels; extracting a first plurality of strings from the first plurality of regions; generating a first combined string by combining the first plurality of strings based on the first plurality of linking labels; and generating an editable electronic version of the HD specifying the first combined string.

In general, in one aspect, the invention relates to a non-transitory computer readable medium (CRM) storing instructions for managing a hardcopy document (HD). The instructions comprise functionality for: obtaining an image of the HD; identifying, within the image, a first plurality of linking labels and a first plurality of regions corresponding to the first plurality of linking labels; extracting a first plurality of strings from the first plurality of regions; generating a first combined string by combining the first plurality of strings based on the first plurality of linking labels; and generating the editable electronic version of the HD specifying the first combined string.

In general, in one aspect, the invention relates to a system for managing a hardcopy document (HD). The system comprises: a computer processor; a buffer storing an image of the HD; an extraction engine executing on the computer processor and configured to: identify, within the image, a first plurality of linking labels and a first plurality of regions corresponding to the first plurality of linking labels; extract a first plurality of strings from the first plurality of regions; generate a first combined string by combining the first plurality of strings based on the first plurality of linking labels; and identify a first layout object associated with the first plurality of regions; and an electronic document engine executing on the computer processor and configured to generate an editable electronic version of the HD specifying the first combined string and the first layout object.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a method, a system, and a non-transitory computer readable medium (CRM) for managing a hardcopy document (HD). Specifically, multiple linking labels and multiple regions corresponding to the linking labels are identified within an image of the HD. These linking labels and regions identify content (e.g., text) in the HD belonging to the same layout object (e.g., main body, header, footer, linked textboxes, etc.). In one or more embodiments of the invention, the linking labels are written on the HD by a user and the outlines of the regions are drawn on the HD by the user. Computer vision may be used to identify the layout object associated with a set of regions, while CR may be used to extract strings from the set of regions. The multiple strings may be combined based on the linking labels, and an electronic editable version of the HD may be generated in which the markup specifies (e.g., using tags) the combined string and the identified layout object.

Figure 1A:
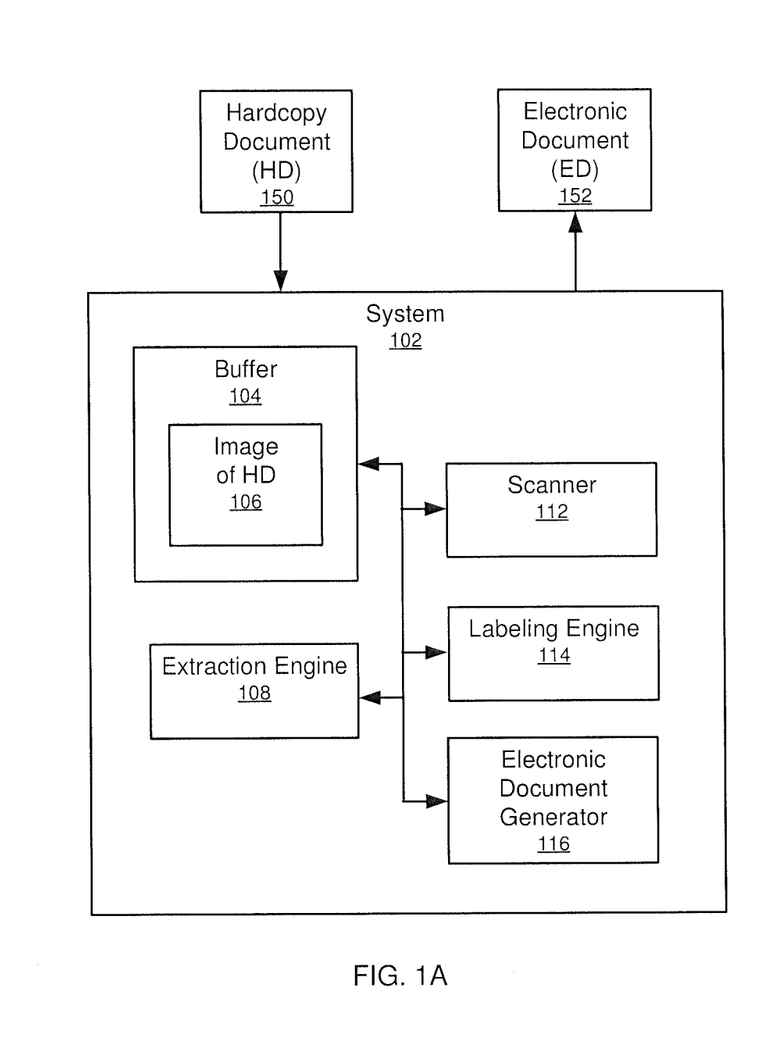
FIG. 1A shows a system in accordance with one or more embodiments of the invention.

FIG. 1A shows a system (102) in accordance with one or more embodiments of the invention. As shown in FIG. 1A, the system (102) has multiple components including a scanner (112), a buffer (104), a labeling engine (114), an extraction engine (108), and an electronic document (ED) generator (116). Each of these components (104, 108, 112, 114, 116) may be located on the same computing device (e.g., a multifunction printer (MFP), a personal computer (PC), a laptop, a smart phone, a PC tablet, a personal digital assistant (PDA), a kiosk, a server, etc.) or may be located on different computing devices connected by a network having wired and/or wireless segments.

In one or more embodiments of the invention, the system (102) inputs a HD (150). The HD (150) may be selected/inputted by a user wishing to generate an electronic document (ED) (152), where the ED (152) is an editable electronic version of the HD (150). The HD (150) may be of any size (e.g., any number of pages) and may have any number of layout objects (e.g., main body, header, footer, linked textboxes, columns, images, graphics, etc.). Those skilled in the art, having the benefit of this detailed description, will appreciate that content (e.g., text) for a single layout object may be fragmented (e.g., partitioned, split, segmented, etc.) into multiple regions within the HD (150). Different regions may be located on different pages of the HD (150). Additionally or alternatively, the different regions of a layout object may be separated by the regions of other layout objects.

For example, assume the HD (150) has two pages. Text for the main body layout object may be fragmented into a region found on page 1 of the HD (150) and a region found on page 2 of the HD (150). In addition to the page break, the fragment on page 1 and the fragment on page 2 may be separated, within the HD (150), by both the footer layout object at the bottom of page 1 and the header layout object at the top of page 2.

As another example, assume the HD (150) has a two linked textboxes on a single page. Each of the linked textboxes may be considered a region of a linked textboxes layout object. These two regions of the linked textboxes layout object may be separated by a region of the main body layout object.

In one or more embodiments of the invention, the outline (e.g., perimeter) of each region in the HD (150) is drawn (e.g., using a pen, pencil, felt marker, etc.) on the HD (150). In other words, a user(s) may draw the outlines of the regions on the HD (150) after the HD (150) is generated. Correctly outlining the regions is the responsibility of the user(s).

In one or more embodiments of the invention, each region in the HD (150) is associated with a linking label. The linking labels are used to identify regions belonging to the same layout object. The linking labels are also used to identify an ordering of the regions belonging to the same layout object. Like the outlines, the linking labels are written (e.g., using a pen, pencil, felt marker, etc.) on the HD (150) after the HD (150) is generated. Correctly writing the linking labels is the responsibility of the user(s).

In one or more embodiments, each linking label starts with a special sequence of characters (e.g., ##, $%, @&, etc.) to denote it is a linking label and not content of the HD (150). Additionally or alternatively, a linking label may be written in a different color than the content of the HD (150) to denote it is a linking label. Following the special characters, if any, each linking label may have a prefix and a suffix. Linking labels having the same prefixes may identify regions belonging to the same layout object, while the suffixes of these linking labels may identify an ordering of the regions corresponding to the layout object. Alternatively, linking labels having the same suffixes may be used to identify regions belonging to the same layout object, while the prefixes of these linking labels may identify an ordering of the regions corresponding to the layout object.

For example, assume a user writes the linking labels "$%A1" and "$%A2" on the HD (150). The prefix "A" is used to identify regions belonging to the same layout object. The suffixes "1" and "2" are used to order these regions corresponding to the same layout object.

In one or more embodiments of the invention, the linking label may also specify a code identifying the layout object. These codes may be numerical values or alphanumerical values of any size. For example, "MB" may be used to denote the region belongs to the main body layout object, while "999" may be used to denote the region belongs to the footer layout object.

Those skilled in the art, having the benefit of this detailed description, will appreciate that any coding scheme may be used for the linking labels, and that each character or digit within the linking label may denote a type of layout object, an instance of a layout object, an ordering of the region within the instance of the layout object, etc.

In one or more embodiments of the invention, the system (102) includes the scanner (112). The scanner (112) is configured to generate an image (106) of the HD (150), including the linking labels and the outlines of the regions. The image (106) may be in color or black and white. Additionally, the image (106) may be of any resolution.

In one or more embodiments of the invention, the system (102) includes the buffer (104). The buffer (104) is configured to store the image (106). For example, the buffer (104) is configured to store the image (106) while other components (108, 114, 116) are processing the image (106). The buffer (104) may be of any size and composed of any type of memory or storage space. The buffer (104) may obtain the image (106) from the scanner (112) or may download the image (106) from a remote source (e.g., a website, an external repository, etc.) (not shown).

In one or more embodiments of the invention, the system (102) includes the extraction engine (108). In one or more embodiments of the invention, the extraction engine (108) is configured to identify linking labels written on the HD (150) by a user(s). The linking labels may be identified by first performing CR on the image (106) and then searching the recognized text for the special characters (e.g., $%, ##) denoting the start of a linking label.

In one or more embodiments of the invention, the extraction engine (108) is configured to identify regions within the image (106). Specifically, the outlines of the regions, drawn by the user, and the types of these layout objects may be identified using computer vision. Any identified patterns may be compared against various templates for the layout objects. Additionally or alternatively, as discussed above, the type of layout object to which the region belongs may be identified from the linking label associated with the region.

In one or more embodiments of the invention, the extraction engine (108) is configured to extract, following CR, one or more strings from each of the identified regions. Further, the extraction engine (108) is also configured to combine the extracted strings. Specifically, strings extracted from regions belonging to the same layout object (e.g., as determined from the prefixes of the linking labels) may be combined (e.g., concatenated) in the order specified by the linking labels (e.g., by the suffixes of the linking labels).

Figure 1B:
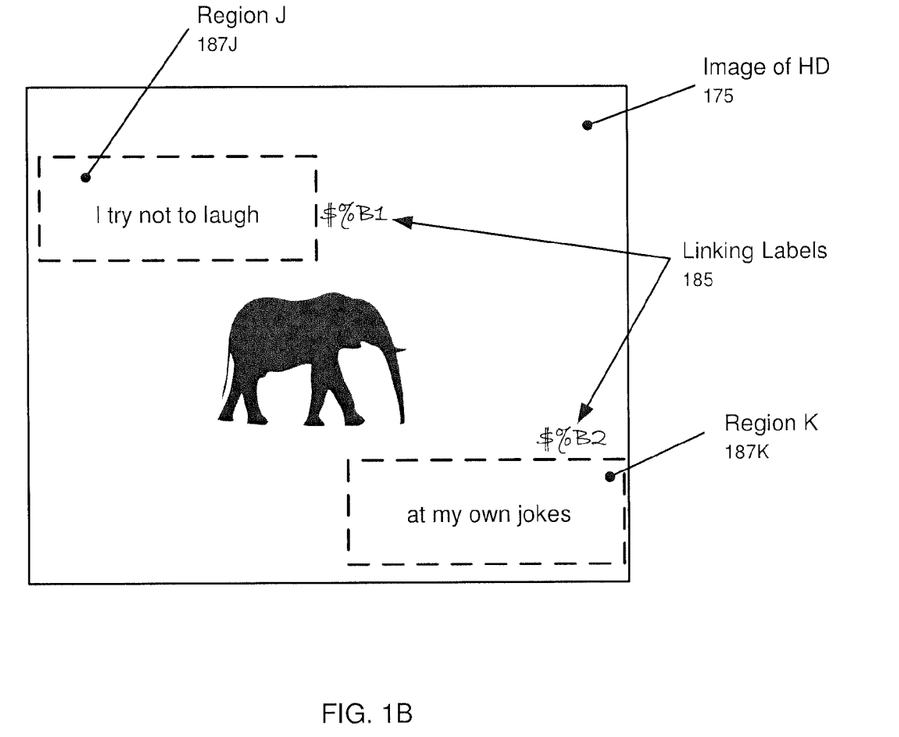
FIG. 1B shows an example in accordance with one or more embodiments of the invention.

FIG. 1B shows an example in accordance with one or more embodiments of the invention. As shown in FIG. 1B, there exists an image (175) of an HD. The image (175) includes two regions: Region J (187J) and Region K (187K). Each region has a corresponding linking label (185) that was written on the HD by a user. The string "I try not to laugh" may be extracted from region J (187J) associated with the linking label "$%B1". Further, the string "at my own jokes" may be extracted from region K (187K) associated with the linking label "$%B2". The "B" in both linking labels (185) denotes these regions belong to the same layout object. Further, the "1" and the "2" in the linking labels (185) denote the order of the regions and thus the order of the extracted strings. As a result, the string "at my own jokes" may be concatenated to the string "I try not to laugh", resulting in the combined string "I try not to laugh at my own jokes"

Referring back to FIG. 1A, in one or more embodiments of the invention, the system (102) includes the ED generator (116). The ED generator (116) is configured to generate the ED (152), which is an editable electronic version of the HD (150). The ED (152) may be represented/defined using a document markup language (e.g., ODF, OOXML, etc.). Accordingly, generating the ED (152) may include adding the identified layout objects and the combined strings to the markup of the ED (152). The layout objects and/or the combined strings may be specified/recorded as tags or as attributes within the tags of the markup of the ED (152). These tags and attributes are needed to correctly render the ED (152) for display or printing.

Those skilled in the art, having the benefit of this detailed description, will appreciate that a rendered version of the ED (152) will closely resemble the HD (150) (without the outlines and linking labels). Moreover, layout objects specified in the markup of the ED (152) will be recognizable/interpretable to word processors. If the ED (152) is opened in a word processor, the editing features of the word processor that are specific to each layout object are now available to the user (i.e., the user now has greater control over the editing of the ED (152)). This degree of control would not be available if all recognized text in an image of the HD was simply inserted into the markup without identifying the layout objects to which the text belongs. In other words, this degree of control would not be available without the use of system (102) the outlines and linking labels provided by the user.

The disclosed embodiments have focused on the HD (150) having both the outlines and the linking labels before the image (106) of the HD (150) is generated. In one or more embodiments of the invention, the system (102) includes the labeling engine (114). The labeling engine (114) is configured to add outlines and/or linking labels to the image (106) after the image (106) is created. In other words, in such embodiments, the HD (150) does not have the outlines of the regions and/or linking labels. Instead, the user adds the outlines and linking labels to the image. The labeling engine (114) may include a graphical user interface (GUI) (not shown) that enables a user to view the image (106), add outlines to the image (106) (e.g., using a stylus, trackball, or other input device), and add linking labels to the image (106) (e.g., using a keyboard, touchpad, etc.).

Figure 2:
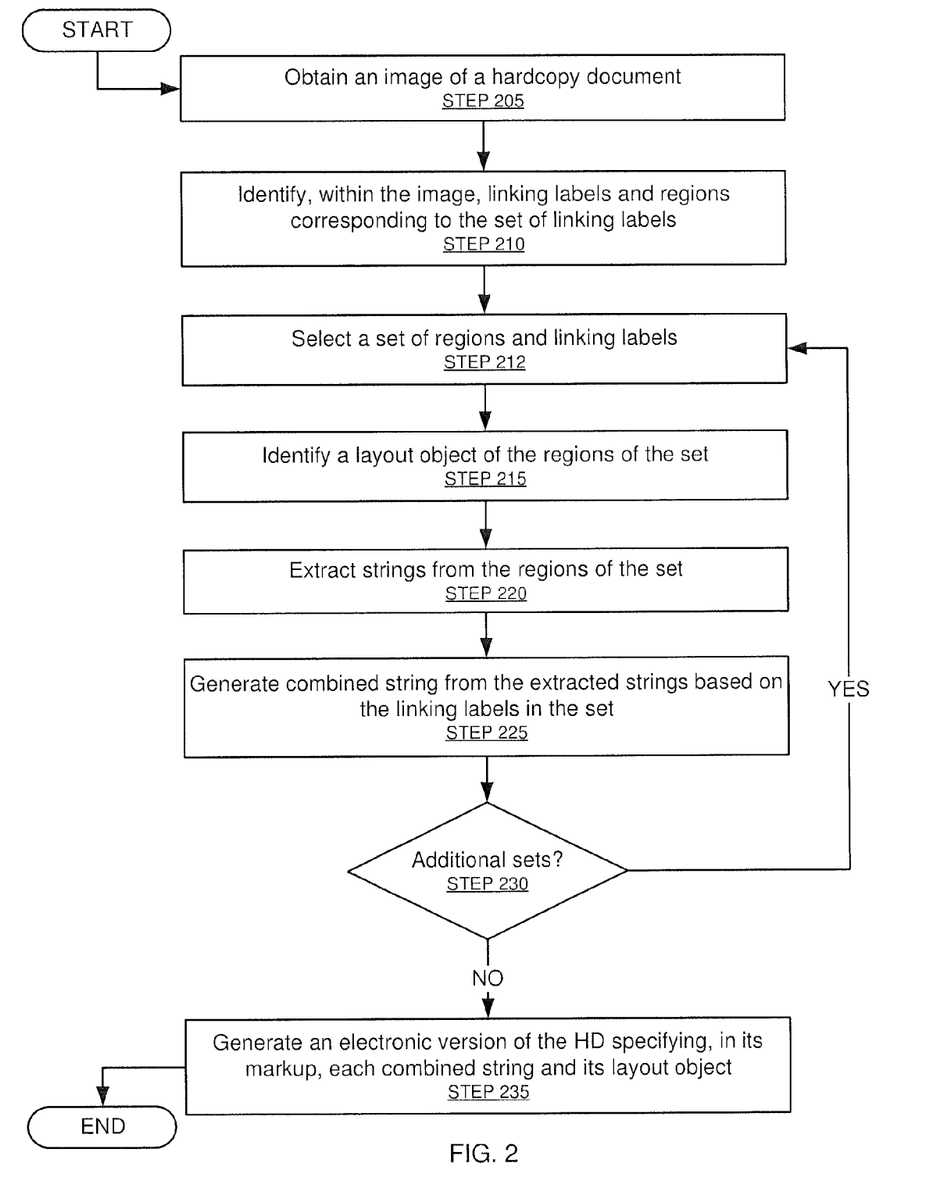
FIG. 2 shows a flowchart in accordance with one or more embodiments of the invention.

FIG. 2 shows a flowchart in accordance with one or more embodiments of the invention. The flowchart depicts a process for managing a HD. This process may be invoked by a user wishing to generate an ED, where the ED is an editable electronic version of the HD. One or more of the steps in FIG. 2 may be performed by the components of the system (102), discussed above in reference to FIG. 1A. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an image of the HD is obtained (STEP 205). The image may be obtained using scanner that scans the HD. Additionally or alternatively, the image may be downloaded from a website, uploaded from a flash drive, or retrieved from any storage location. The image may be of any size (i.e., any number of pages), of any resolution, and be in color or grayscale. The image may be in any format (e.g., JPEG, GIF, etc.).

In STEP 210, regions and linking labels associated with the regions are identified within the image. As discussed above, the outlines of the regions may have been drawn, by a user, on the HD and thus are visible in the image. As also discussed above, the linking labels may have been written, by a user, on the HD and thus are also visible in the image. The outlines of the regions, and thus the regions themselves, may be identified by applying one or more computer vision algorithms to the image. The linking labels may be identified by applying one or more CR algorithms to the image, and then searching the recognized characters for the special characters (e.g., $%, ##, etc.) denoting the start of a linking label.

As discussed above, the sequence of characters (e.g., prefix) in linking labels may be used to identify regions belonging to the same layout object. Accordingly, regions belonging to the same layout object and the linking labels corresponding to the regions may be grouped into sets.

In STEP 212, a set of regions and linking labels is selected. In one or more embodiments of the invention, the set is selected at random. In one or more embodiments of the invention, the linking labels (e.g., the prefixes of the linking labels) specify the order in which sets should be selected (e.g., prefix "A" before prefix "C"). In one or more embodiments of the invention, the set having the first region encountered while parsing/traversing the image is selected.

In STEP 215, the layout object composed of the set of regions is identified. In one or more embodiments of the invention, this identification is executed using computer vision algorithms. The regions in the set may form a pattern, and this identified pattern may be compared against template patterns to identify the layout object (e.g., main body layout object, header layout object, footer layout object, linked textboxes layout object, etc.). In one or more embodiments of the invention, the linking labels in the set specify the layout object.

In STEP 220, content (e.g., strings) is extracted from the set of regions. These strings may span any number of lines and may be of any length. In STEP 225, the extracted strings are combined (e.g., concatenated). The extracted strings may be combined in an order specified by the linking labels in the set. An attempt may also be made to identify the font, font style, font size, etc. of the extracted stings in the regions.

In STEP 230, it is determined whether additional sets in the image require processing. When it is determined that additional steps in the image require processing, the process returns to STEP 212. When it is determined that all steps in the image require processing, the process proceeds to STEP 235.

In STEP 235, the ED is generated. The ED is an editable electronic version of the HD. The ED may be represented/defined using a document markup language (e.g., ODF, OOXML, etc.). Accordingly, generating the ED may include adding each identified layout object and its combined string to the markup of the ED. In other words, the markup of the ED specifies (e.g., using tags and/or attributes of tags) the layout object and its combined string. Any identified fonts, font sizes, font styles may also be specified in the markup using tags and/or attributes. All the tags and attributes are needed to correctly render the ED.

Those skilled in the art, having the benefit of this detailed description, will appreciate that a rendered version of the ED will closely resemble the HD (without the outlines and linking labels). Moreover, layout objects specified in the markup of the ED will be recognizable/interpretable to word processors. If the ED is opened in a word processor, the editing features of the word processor that are specific to each layout object are now available to the user (i.e., the user now has greater control over the editing of the ED). This degree of control would not be available if all recognized text in an image of the HD was simply inserted into the markup without identifying the layout objects to which the text belongs. In other words, this degree of control would not be available without the use of the process shown in FIG. 2.

Figure 3A:
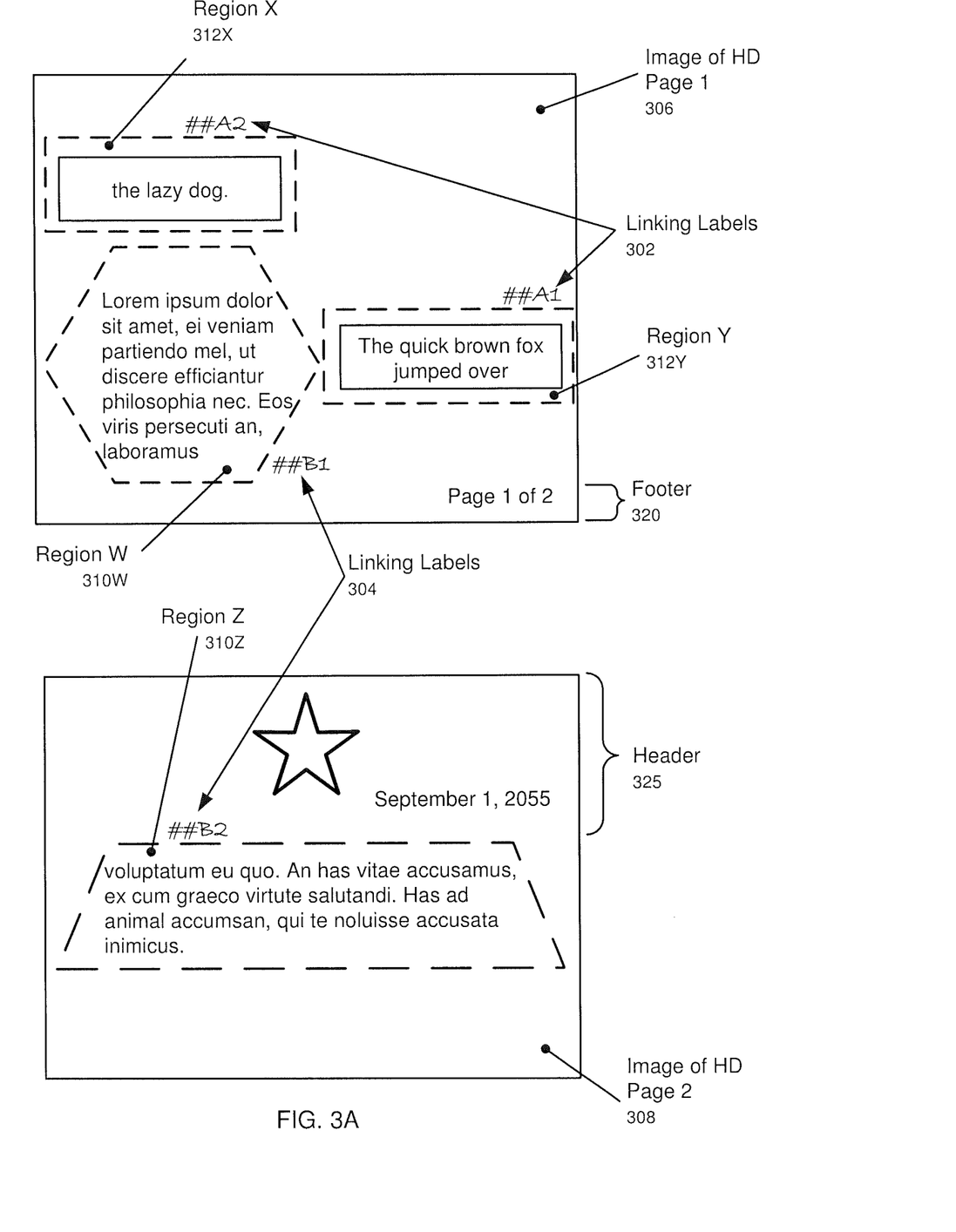
FIG. 3A and FIG. 3B show examples in accordance with one or more embodiments of the invention.
Figure 3B:
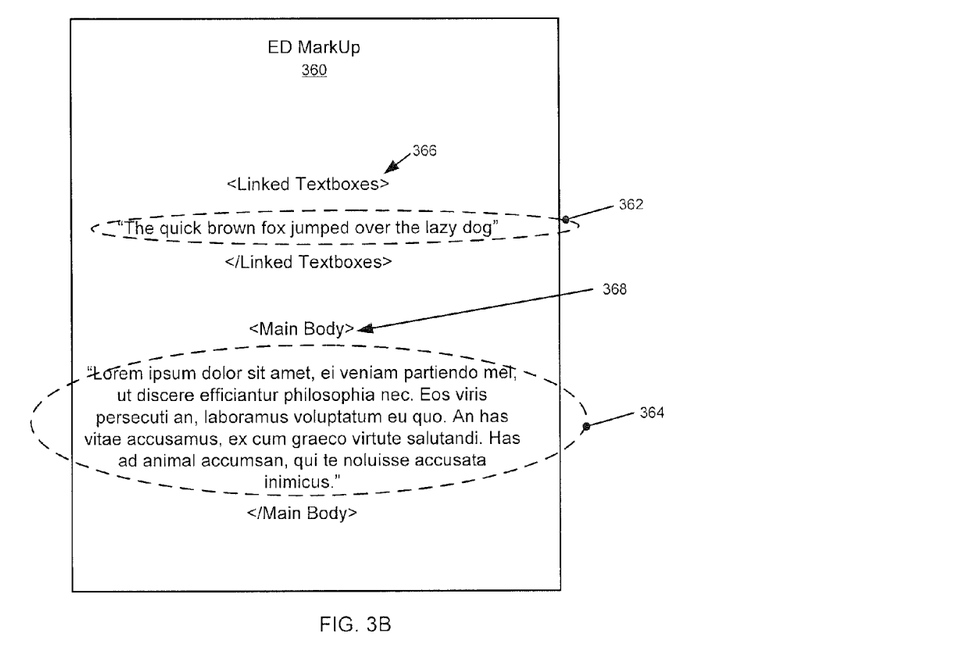

FIG. 3A and FIG. 3B show examples in accordance with one or more embodiments of the invention. Specifically, FIG. 3A shows an image of an HD having a first page (306)

and a second page (308). Prior to the image being generated, a user drew outlines (shown as dashed lines) on the HD to identify four regions: region X (312X), region Y (312Y), region W (310W), and region Z (310Z). The user is able to identify that region X (312X) and region Y (312Y) belong to the same layout object (i.e., linked textboxes layout object). Similarly, the user is able to identify that region W (310W) and region Z (310Z) belong to the same layout object (i.e., main body layout object). Moreover, the user is also able to determine that the footer (320) and the header (325) do not belong to the same layout object as region W (310W) and region Z (310Z). In fact, as shown in FIG. 3A, the footer (320) and the header (325) separate two regions (310W, 310Z) belonging to the same layout object.

In order to correctly group the regions (312X, 312Y, 310W, 310Z), the user wrote linking labels (302, 304) on the HD. Each linking label corresponds to one of the regions (312X, 312Y, 310W, 310Z). Specifically, regions belonging to the same layout object are given linking labels having the same starting characters. For example, the linking labels (302) assigned to region X (312X) and region Y (312Y) both start with the characters "##A", while the linking labels (304) assigned to region W (310W) and region Z (310Z) both start with the characters "##B".

The linking labels (302, 304) also specify an ordering among regions belonging to the same layout object. For example, based on the "1" and the "2" in the linking labels (302), it is clear that the content (i.e., text) in region Y (312Y) comes before the content (i.e., text) in region X (312X). Similarly, based on the "1" and the "2" in the linking labels (304), it is clear that the content (i.e., text) in region W (310W) comes before the content (i.e., text) in region Z (310Z).

Because outlines were drawn on the HD and because linking labels were written on the HD, the system (102) and/or the process depicted in FIG. 2 are able to identify the regions, identify the layout object, and group regions belonging to the same layout object. This may include applying computer vision algorithms to the image to find the outlines and/or applying CR algorithms to the image to find the linking labels. The system (102) and/or the process depicted in FIG. 2 are also able to extract text from each region and then combine (i.e., concatenate), in the correct order set by the linking labels, the text into a combined string for each layout object.

FIG. 3B shows an ED markup (360). The ED markup (360) is the output of system (102) and/or the process depicted in FIG. 2. As shown in FIG. 3B, the markup (360) specifies each identified layout object (366, 368) and the combined string (362, 364) for each layout object (366, 368). Those skilled in the art, having the benefit of this detailed description, will appreciate that a rendered version of the ED markup (360) will closely resemble the HD (without the outlines and linking labels). Moreover, layout objects (366, 368) specified in the markup of the ED will be recognizable/interpretable to word processors. If the ED markup is opened in a word processor, the editing features of the word processor that are specific to each layout object (366, 368) are now available to the user (i.e., the user now has greater control over the editing of the ED). This degree of control would not be available if all recognized text in an image of the HD was simply inserted into the markup without identifying the layout objects to which the text belongs.

Various embodiments of the invention may have one or more of the following advantages: the ability to generate an electronic editable version of a HD; the ability to leverage user outlines and linking labels to generate an electronic editable version of an HD; the ability to generate, from an image of a HD, an ED with layout objects that are recognizable/interpretable to a word processor; the ability to order multiple regions belonging to a layout object using linking labels; the ability to group regions using linking labels; etc.

Figure 4:
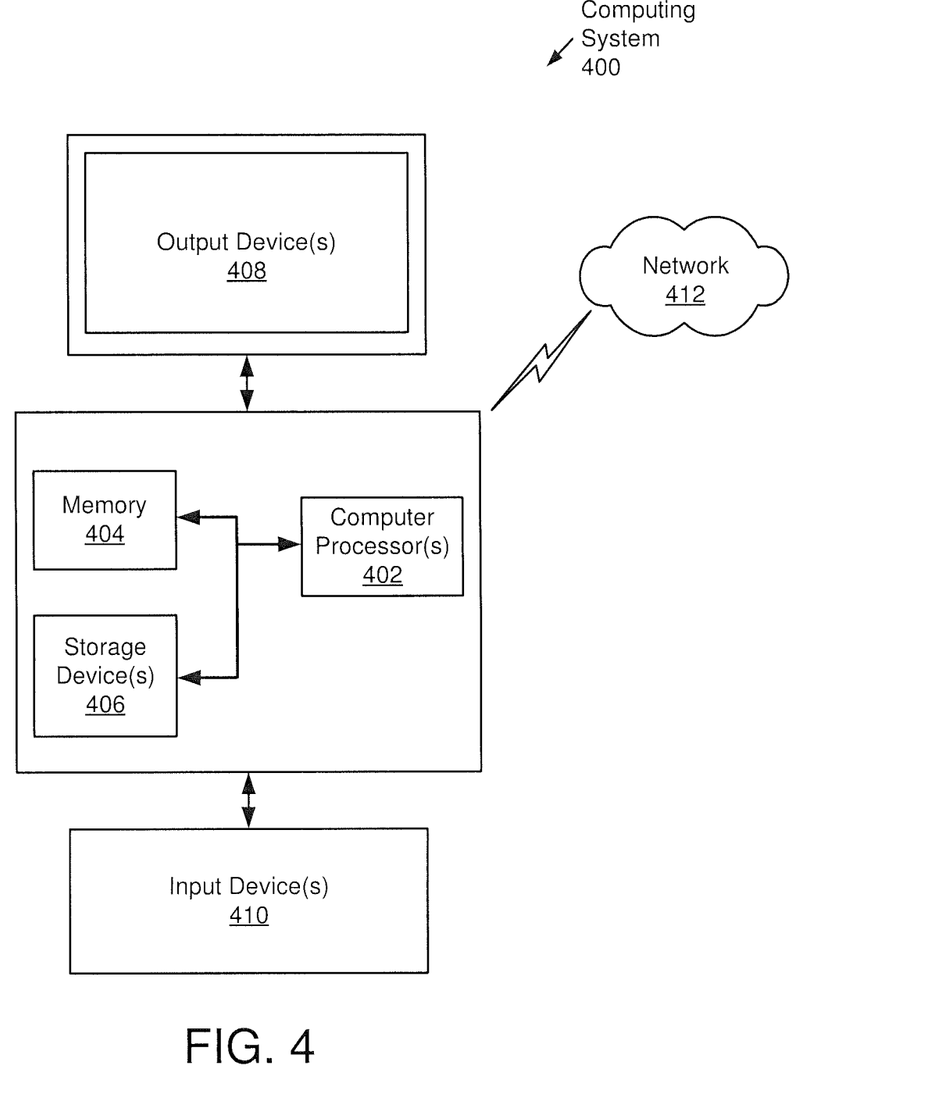
FIG. 4 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a hardcopy document (HD), comprising:
    obtaining an image of the HD comprising a first plurality of linking labels corresponding to a first plurality of regions enclosed by a plurality of outlines,
    wherein the first plurality of linking labels and the plurality of outlines are added to the image by a user or drawn on the HD by the user before the image is generated;
    identifying, within the image, a first region and a first linking label specifying an instance of a first layout object and an ordering of the first region in the instance of the first layout object;
    identifying, within the image, a second region and a second linking label specifying the instance of the first layout object and an ordering of the second region in the instance of the first layout object,
    wherein the first plurality of linking labels comprises the first linking label and the second linking label, and
    wherein the first plurality of regions comprises the first region and the second region;
    extracting a first plurality of strings from the first plurality of regions;
    generating a first combined string by combining the first plurality of strings based on the ordering of the first region specified in the first linking label and the ordering of the second region specified in the second linking label; and
    generating an editable electronic version of the HD specifying the first combined string, wherein the first linking label and the second linking label are not visible in a rendered version of the editable electronic version of the HD.

2. The method of claim 1, wherein the editable electronic version of the HD comprises a markup, and wherein the first combined string and a type of the first layout object are specified in the markup.

3. The method of claim 2, wherein the type of the first layout object is at least one selected from a group consisting of linked textboxes and main body text.

4. The method of claim 2, further comprising:
    identifying, within the image, a second plurality of linking labels;
    extracting a second plurality of strings from a second plurality of regions corresponding to the second plurality of linking labels;
    generating a second combined string by combining the second plurality of strings based on the second plurality of linking labels; and
    identifying a type of a second layout object associated with the second plurality of regions,
    wherein the electronic version further specifies the second combined string and the type of the second layout object in the markup.

5. The method of claim 4, wherein each of the first plurality of linking labels comprises a first starting character sequence, and wherein each of the second plurality of linking labels comprises a second starting character sequence that is different than the first starting character sequence.

6. A non-transitory computer readable medium (CRM) storing instructions for managing a hardcopy document (HD), the instructions comprising functionality for:
    obtaining an image of the HD comprising a first plurality of linking labels corresponding to a first plurality of regions enclosed by a plurality of outlines,
    wherein the first plurality of linking labels and the plurality of outlines are added to the image by a user or drawn on the HD by the user before the image is generated;
    identifying, within the image, a first region and a first linking label specifying an instance of a first layout object and an ordering of the first region in the instance of the first layout object;
    identifying, within the image, a second region and a second linking label specifying the instance of the first layout object and an ordering of the second region in the instance of the first layout object,
    wherein the first plurality of linking labels comprises the first linking label and the second linking label, and
    wherein the first plurality of regions comprises the first region and the second region;
    extracting a first plurality of strings from the first plurality of regions;
    generating a first combined string by combining the first plurality of strings based on the ordering of the first region specified in the first linking label and the ordering of the second region specified in the second linking label; and
    generating the editable electronic version of the HD specifying the first combined string, wherein the first linking label and the second linking label are not visible in a rendered version of the editable electronic version of the HD.

7. The non-transitory CRM of claim 6, wherein the editable electronic version of the HD comprises a markup, and wherein the first combined string and a type of the first object are specified in the markup.

8. The non-transitory CRM of claim 7, wherein the type of the first layout object is at least one selected from a group consisting of linked textboxes and main body text.

9. The non-transitory CRM of claim 7, the instructions further comprising functionality for:
    identifying, within the image, a second plurality of linking labels;
    extracting a second plurality of strings from a second plurality of regions corresponding to the second plurality of linking labels;
    generating a second combined string by combining the second plurality of strings based on the second plurality of linking labels; and
    identifying a type of a second layout object associated with the second plurality of regions,
    wherein the editable electronic version further specifies the second combined string and the type of the second layout object in the markup.

10. The non-transitory CRM of claim 9, wherein each of the first plurality of linking labels comprises a first starting character sequence, and wherein each of the second plurality of linking labels comprises a second starting character sequence that is different from the first starting character sequence.

11. A system for managing a hardcopy document (HD), comprising:

a memory; and a computer processor connected to the memory and that:

obtains an image of the HD comprising a first plurality of linking labels corresponding to a first plurality regions enclosed by a plurality of outlines, wherein the first plurality of linking labels and the plurality of outlines are added to the image by a user or drawn on the HD by the user before the image is generated;

identifies, within the image, a first region and a first linking label specifying an instance of a first layout object and an ordering of the first region in the instance of the first layout object;

identifies, within the image, a second region and a second linking label specifying the instance of the first layout object and an ordering of the second region in the instance of the first layout object, wherein the first plurality of linking labels comprises the first linking label and the second linking label, and wherein the first plurality of regions comprises the first region and the second region;

extracts a first plurality of strings from the first plurality of regions;

generates a first combined string by combining the first plurality of strings based on the ordering of the first region specified in the first linking label and the ordering of the second region specified in the second linking label; and identifies a type of the first layout object associated with the first plurality of regions; and generates an editable electronic version of the HD specifying the first combined string and the type of the first layout object, wherein the first linking label and the second linking label are not visible in a rendered version of the editable electronic version of the HD.

12. The system of claim 11, further comprising:

a scanner configured to generate the image of the HD, wherein the computer processor also:

receives the first plurality of linking labels from a user; and modifies the image to include the linking labels.

13. The system of claim 11, wherein the computer processor also:

identifies, within the image, a second plurality of linking labels;

extracts a second plurality of strings from a second plurality of regions corresponding to the second plurality of linking labels;

generates a second combined string by combining the second plurality of strings based on the second plurality of linking labels; and identifies a type of a second layout object associated with the second plurality of regions, wherein the editable electronic version further specifies the second combined string and the type of the second layout object.

14. The system of claim 13, wherein:

each of the first plurality of linking labels comprises a first starting character sequence; and each of the second plurality of linking labels comprises a second starting character sequence that is different from the first starting character sequence.

* * * * *